(12) United States Patent
Farwig

(10) Patent No.: US 8,210,678 B1
(45) Date of Patent: Jul. 3, 2012

(54) MULTIBAND CONTRAST-ENHANCING LIGHT FILTER AND POLARIZED SUNGLASS LENS COMPRISING SAME

(76) Inventor: Michael J. Farwig, Stevenson Ranch, CA (US)

( * ) Notice: Subject to any disclaimer, the term of this patent is extended or adjusted under 35 U.S.C. 154(b) by 95 days.

(21) Appl. No.: 12/928,059

(22) Filed: Dec. 2, 2010

Related U.S. Application Data

(60) Provisional application No. 61/284,545, filed on Dec. 21, 2009.

(51) Int. Cl.
*G02C 7/10* (2006.01)
*G02B 5/20* (2006.01)

(52) U.S. Cl. .................................. 351/159.65; 359/722

(58) Field of Classification Search .......... 351/163–165, 351/159.6–159.65; 359/722, 723
See application file for complete search history.

(56) References Cited

U.S. PATENT DOCUMENTS

| | | |
|---|---|---|
| 5,694,240 A | 12/1997 | Sternbergh |
| 5,925,468 A | 7/1999 | Stewart |
| 6,145,984 A | 11/2000 | Farwig |
| 6,334,680 B1 | 1/2002 | Larson |
| 6,420,290 B1 | 7/2002 | Brocheton et al. |
| 6,604,824 B2 | 8/2003 | Larson |
| 6,650,473 B2 | 11/2003 | Nakagoshi |
| 6,667,259 B2 | 12/2003 | Clasen et al. |
| 6,770,692 B1 | 8/2004 | Kobayashi et al. |
| 6,773,816 B2 | 8/2004 | Tsutsumi |
| 680,700 A1 | 10/2004 | Nakagoshi |
| 6,852,657 B2 | 2/2005 | Kolberg et al. |
| 7,372,640 B2 | 5/2008 | Fung |
| 7,597,441 B1 | 10/2009 | Farwig |

*Primary Examiner* — Darryl J Collins
(74) *Attorney, Agent, or Firm* — Martin Fruitman

(57) ABSTRACT

The invention is a polarized sunglass lens that comprises a multiband contrast enhancer to provide relatively high light transmittance for portions of the red, green, and blue spectra, while blocking UV and visible violet wavelengths, and optionally blocking deep-red wavelengths, in a single lens layer which when positioned as the front lens layer also protects the internal lens layers from UV-induced degradation. The multiband contrast enhancer comprises a combination of a copper halide or copper indium compound with rare-earth oxides in a heat-treated glass composition, or a combination of narrowband and sharp-cut absorbing dyes in a plastic composition, and provides attenuation of the UV and violet spectrum, thus protecting the user's eyes and the internal layers and colorants from UV-induced damage while providing enhanced optical contrast, color saturation, and visual acuity for the wearer.

15 Claims, 12 Drawing Sheets

—— Light filter of the present invention with UV425 rating
- - - - - - Prior-art light filter according to US 6,145,984

MULTIBAND CONTRAST-ENHANCING LIGHT FILTER AND POLARIZED SUNGLASS LENS COMPRISING SAME

This application claims the benefit of U.S. provisional patent application No. 61/284,545 entitled "CONTRAST-ENHANCING POLARIZED LENS WITH SHARP-CUT-OFF FILTERING OF VIOLET AND ULTRAVIOLET LIGHT" filed on Dec. 21, 2009, which is hereby, incorporated herein by reference.

BACKGROUND OF THE INVENTION

1. Field of the Invention

The present invention relates to sunglass lenses, particularly to polarized sunglass lenses which enhance contrast and color saturation using narrowband light-filtering means.

2. Description of Related Technology

Recent advances in sunglass lens technology, such as polarized lenses incorporating certain rare-earth compounds, have brought long-desired improvements in perceived color saturation, contrast, and visual acuity. In particular, lenses made in conformance with U.S. Pat. Nos. 6,145,984 and 7,597,441 issued to Farwig demonstrate the advantages of combining light polarization with narrowband light filtration through the use of a glass composition comprising three particular rare-earth oxides in order to achieve a remarkable degree of vision enhancement.

Rare-earth oxides are oxides of metals in the lanthanide and actinide series of the periodic table of elements. When incorporated into optical glass compositions, some of these rare-earth metal oxides favor the transmittance of red, green, and blue primary wavelengths and selectively absorb and reduce the transmittance of certain non-primary wavelengths.

Light filters used in sunglass lenses of the prior art can be divided into two main categories, those which absorb light at certain wavelengths by converting the light energy of those wavelengths into heat energy which is then dissipated within the filter, and those whose front surface has a semi-transparent mirror coating that reflects some of the light back toward its source and away from the filter thereby reducing light transmittance. The majority of prior-art sunglass lenses have comprised light filters which primarily absorb light; some of these have also comprised front-surface mirror coatings which further reduce or modify light transmittance. Lenses with colored semi-transparent mirrors have been used to reduce the transmittance of that portion of the spectrum which corresponds to the color of the mirror.

Polarizers have also been extensively used in sunglass lenses of the prior art. Polarizers reduce excess light (glare) reflected from terrestrial surfaces by exploiting the fact that glare reflected from horizontal surfaces becomes polarized, predominately in a single plane. This means that the electric fields propagated by the reflected light rays share a common planar alignment. When viewing through an optical polarizer, such as a polarized lens, the reflected glare is extinguished if the polarized lens is oriented (rotated) so that its polarization axis opposes by 90 degrees the electric-field plane of the reflected glare. This effect is due to the absorption within the polarizer of the electric field of the reflected glare.

Some light filters used in sunglass lenses of the prior art have comprised a type of light-filtering means referred to herein as "sharp-cut" light-filtering means. This type of light filter is characterized by a steep reduction of transmittance for wavelengths above or below a selected wavelength. Examples of sharp-cut light-filtering means used in sunglass lenses of the prior art include UV filters which block UV wavelengths but transmit visible wavelengths, and IR filters which block IR wavelengths but transmit visible wavelengths.

It has been common practice in the sunglass industry to provide lenses which block ultraviolet (UV) light in the wavelength range from 200-400 nanometers (nm). Sunglass lenses which block all UV and near-UV wavelengths up to 400 nm are given the "UV400" rating. Lenses which block up to 425 nm or 450 nm would thus be rated "UV425" and "UV450" respectively, even though the actual UV spectrum only extends to 380 nm.

It is common belief in the ophthalmic industry that chronic and excess ocular exposure to light in the short-wavelength visible spectrum, i.e., visible violet, can be a factor in the development of a vision-degrading condition known as macular degeneration. Thus it is advantageous for a sunglass lens to block visible violet light as well as UV light. Visible violet wavelengths comprise the range of 380 nm to approximately 450 nm.

Some sunglass lenses of the prior art have provided blocking of all UV light while also blocking all violet and blue wavelengths from 400 nm to as high as 500 nm. Examples of such lenses include the so-called "Blue Blocker" and other similarly-tinted lenses, typically exhibiting a strong orange or amber tint. Lenses of this type are incapable of preserving accurate color perception for the wearer because they remove too much of the less dangerous longer-wavelength portion of the blue spectrum, typically between 460 nm and 500 nm. The result is that blue skies can appear grayish when viewed through such lenses, and practically everything else appears strongly yellowish.

Polarized sunglass lenses of prior art can be prone to fading and discoloration when exposed to chronic, prolonged, and excessive levels of UV light as can occur when the lenses remain in a static position for long periods exposed to direct sunlight. This type of degradation may occur in sunglasses which have been on display in direct sunlight such as in a store window, or frequently left on the dashboard of a vehicle parked in direct sunlight. This is caused by the sensitivity to UV of the color dyes which are usually present in polarizer film along with the iodine that provides polarization. The color dyes give the film and associated lens the desired light transmittance and tint. Many commonly-used organic dyes are prone to UV-induced degradation, an undesirable trait for a sunglass lens. Adhesives used in polarized lenses may also contain dyes that are prone to damage from UV light.

It has been common practice in the manufacturing of prescription polarized sunglass lenses of the prior art to use two lens elements laminated together with a polarizer film encapsulated between the lens elements, the prescription lens element being a clear, untinted composition. This prevents the varying thickness of the prescription lens element from causing a corresponding variation in optical density and light transmittance, i.e., a "vignetting" effect.

In prescription polarized sunglass lenses of the prior art which use a layer of non-UV-blocking tinted glass (including contrast-enhancing types containing rare-earth oxides) and a layer of colorless or nearly-colorless UV-blocking glass, the front lens element is the tinted glass while the rear lens element is the UV-blocking glass. This avoids the aforementioned vignetting effect. Since the vast majority of UV entering a sunglass lens enters from the front, it would be beneficial to incorporate a UV-blocking means in the front lens element of a polarized lens, regardless of whether or not a UV-blocking means is also provided by the rear lens element, in order to protect the polarizer film dyes as previously mentioned.

Sharp-cut light-filtering means used in sunglass lenses of the prior art to selectively block UV wavelengths with minimal effect on visible wavelengths include the incorporation of glass dopants such as cerium oxide, which is known to absorb UV wavelengths below 380 nm; the usage of heat-treated glass compositions containing various copper compounds which block UV; and the usage of plastic compositions containing dyes which selectively absorb UV wavelengths without causing significant absorption of visible wavelengths.

Sharp-cut light-filtering means to block infrared (IR) and near-IR wavelengths have also been used in prior-art sunglass lenses; one such means is the so-called "hot mirror". This is a front-surface mirror coating which selectively reflects IR and near-IR wavelengths (referred to herein as "deep-red wavelengths"), thereby reducing or blocking transmittance of these wavelengths. Sharp-cut light filters are also known in the optical industry as "square-edge" filters. FIG. 2 depicts the light transmittance of a typical sharp-cut UV light filter, while FIG. 9 depicts the light transmittance of a typical sharp-cut deep-red light filter over the visible range of wavelengths from 400 nm to 800 nm.

It is known that chromatic aberration occurs naturally in the human eye as well as in manufactured optical lenses unless measures are taken to prevent it. Chromatic aberration is the failure of a lens to properly focus all visible wavelengths of light, producing a "fringing" effect visible along the edges of viewed objects. The extreme ends of the visible light spectrum, pure violet and deep-red, comprise the wavelengths that are most difficult for the human eye, as well as for single-element lenses in general, to focus. This is due to the variation in refractive index within a lens that occurs at different wavelengths. Prior-art lenses such as the aforementioned "Blue Blocker" types, which completely block the transmittance of violet, violet-blue, and blue wavelengths greatly reduce chromatic aberration for the wearer, thus improving visual acuity, i.e., sharpness; but these types of lenses have always had a vivid orange-amber tint which degrades color accuracy and perception for the wearer as previously stated.

It would be very beneficial for a polarized sunglass lens to provide enhanced optical contrast, color saturation, and visual acuity while completely blocking UV and visible-violet wavelengths in the front lens element, thus protecting internal color dyes from UV-induced degradation while also protecting the eyes of the wearer from UV and visible-violet light. In the interest of maximum visual acuity for the wearer, it would be of further benefit for such a lens to provide blocking of deep-red wavelengths between 750 nm and 800 nm.

SUMMARY OF THE INVENTION

The invention is a polarized sunglass lens that uses a light filter comprising a multiband contrast enhancer with narrow-band light-filtering means to provide relatively high transmittance for selected portions of the red, green, and blue spectra; sharp-cut light-filtering means in order to block UV and visible violet wavelengths; and optional deep-red light-filtering means in order to block the transmittance of wavelengths between 750 nm and 800 nm. The invention yields these characteristics in a single lens element which, being positioned as the front lens element in a multilayer polarized lens, protects dyes present in the internal lens layers such as the polarizer film and adhesive from UV-induced degradation, while protecting the eyes of the wearer from UV and violet light. FIG. 1 is a section view of a preferred embodiment of the present invention. Lens elements 13 and 17 are laminated together using adhesive layers 14 and 16, with light polarizer 15 disposed within.

Glass lenses of the present invention typically use a glass composition comprising a copper halide or a copper-indium compound and oxides of neodymium, praseodymium, and erbium. This type of glass is subjected to a secondary heating process after the initial melting and forming processes in order to produce the desired filter parameters for UV and visible-violet wavelengths in the finished lenses.

Plastic lenses of the present invention use sharp-cut absorbing dyes to block UV and violet light with narrowband absorbing dyes which simulate the transmittance properties of the rare-earth oxides used in glass embodiments. Rare-earth acetate or acetylacetonate dyes can be used in molded thermoplastic polyurethane lenses of the present invention, while other narrowband dyes are available for molded thermoplastic polycarbonate lenses of the present invention.

DETAILED DESCRIPTION OF THE INVENTION

Figure 1:
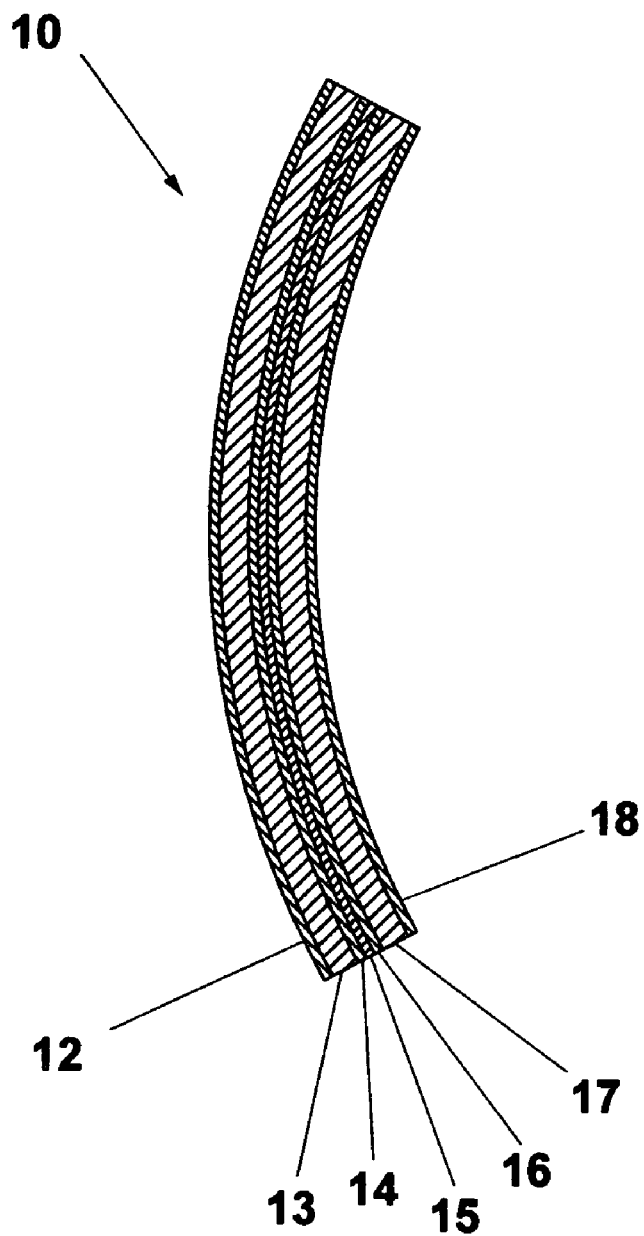
FIG. 1 is a cross-section view of the preferred embodiment of the invention, which is a laminated multilayer lens comprising a multiband contrast enhancer and a light polarizer.
Figure 2:
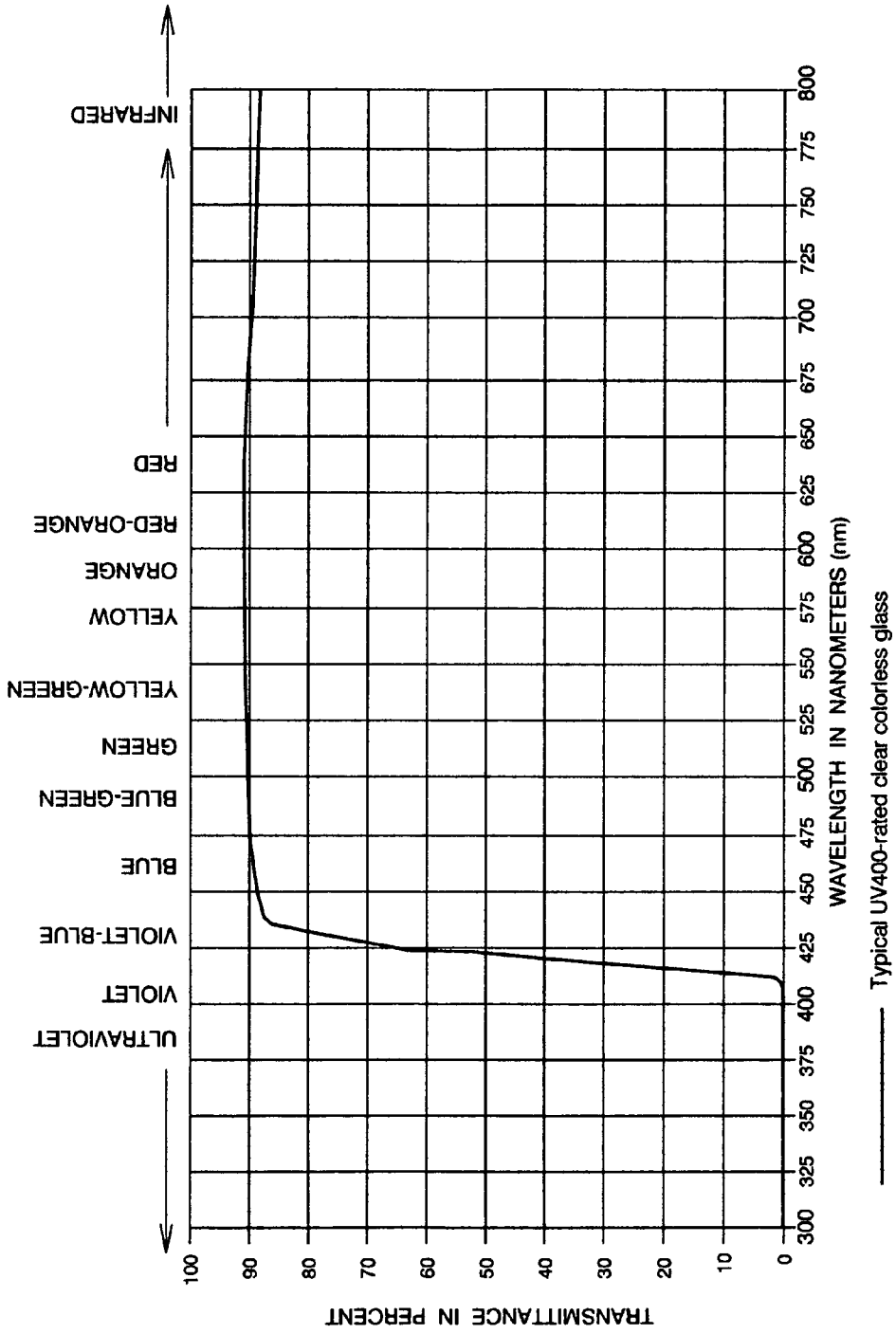
FIG. 2 is a graph of the light-transmittance properties of a typical UV400-rated glass of the prior art which blocks UV wavelengths up to approximately 410 nm without significant effect on visible wavelengths above 430 nm.
Figure 3:
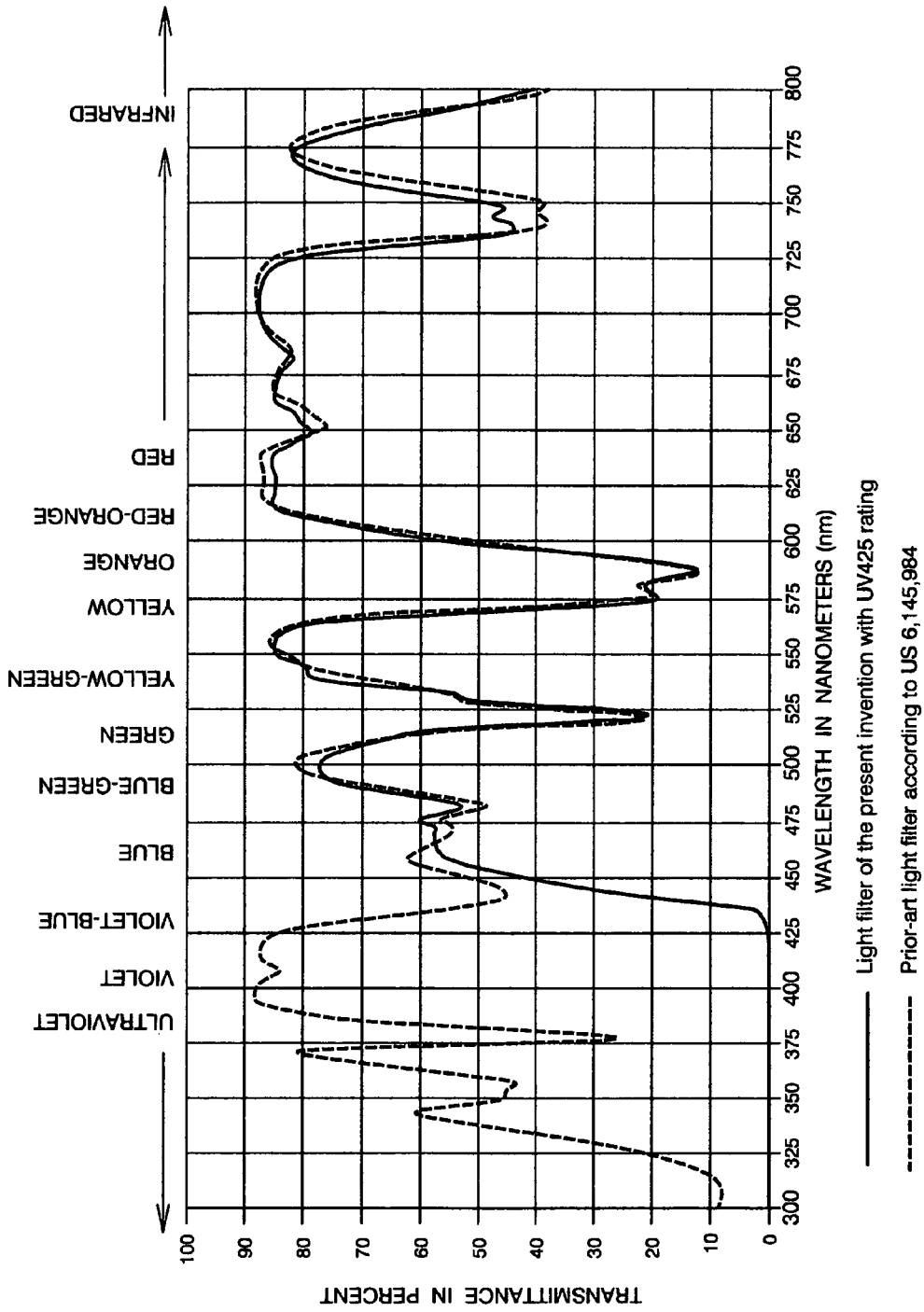
FIG. 3 is a graph comparing the light-transmittance properties of a multiband contrast enhancer (light filter) of the present invention to the light-transmittance properties of the light filter comprising neodymium oxide, praseodymium oxide, erbium oxide, and vanadium pentoxide as disclosed in U.S. Pat. No. 6,145,984.
Figure 4:
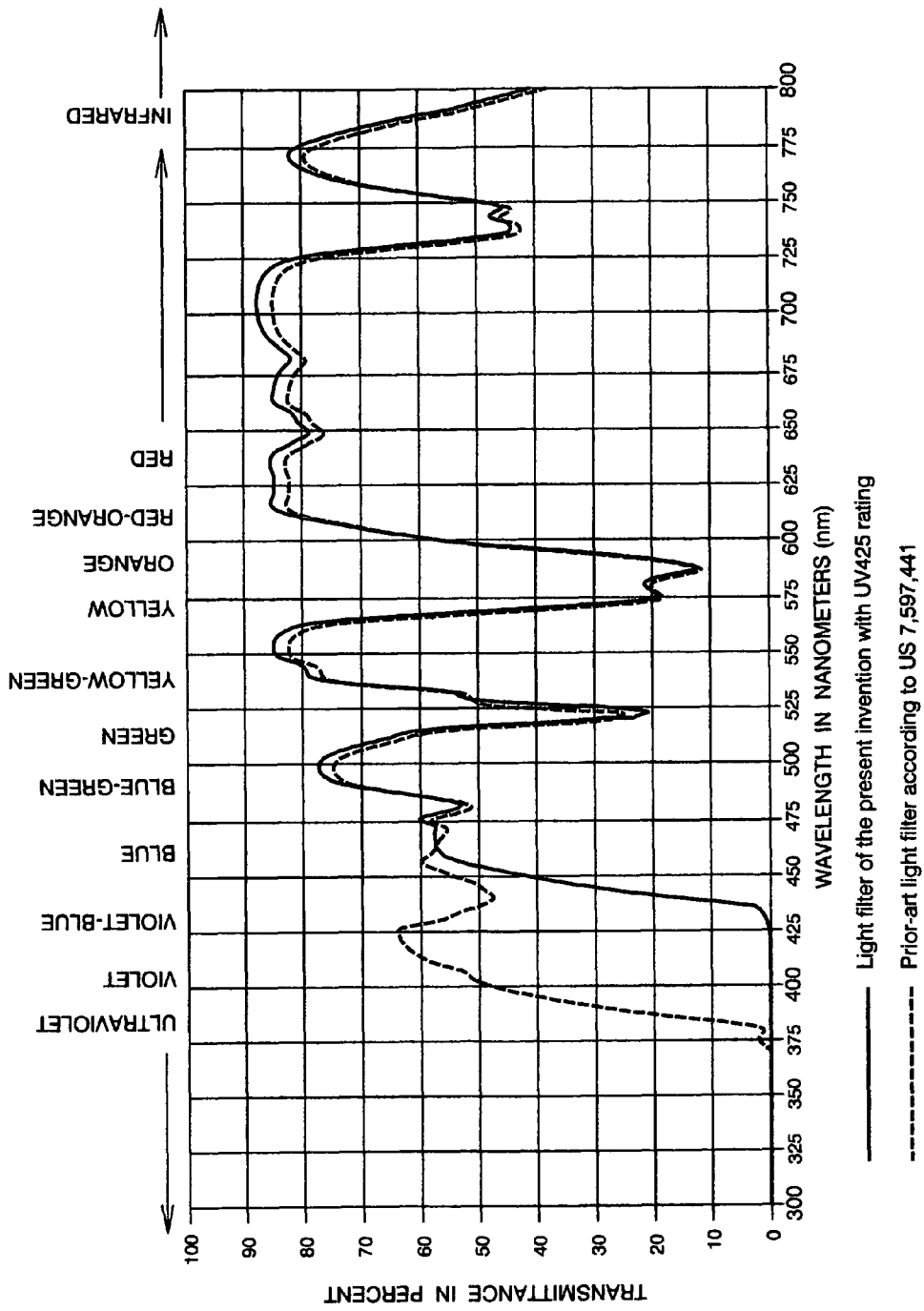
FIG. 4 is a graph comparing the light-transmittance properties of a multiband contrast enhancer of the present invention to the light-transmittance properties of the light filter comprising neodymium oxide, praseodymium oxide, and erbium oxide as disclosed in U.S. Pat. No. 7,597,441.
Figure 5:
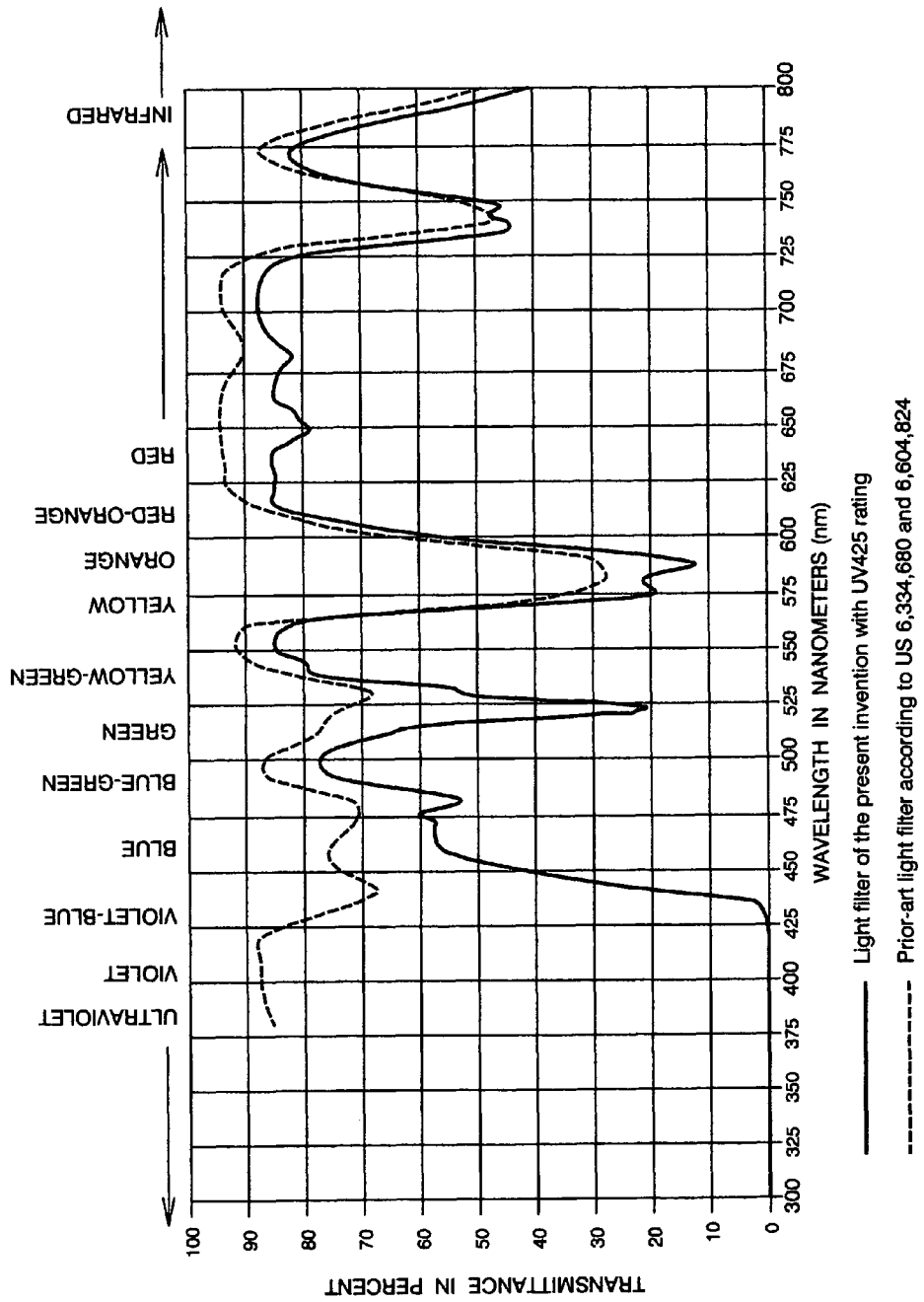
FIG. 5 is a graph comparing the light-transmittance properties of a multiband contrast enhancer of the present invention to the light-transmittance properties of the light filter comprising neodymium oxide as disclosed in U.S. Pat. No. 6,604,824 and U.S. Pat. No. 6,334,680.
Figure 6:
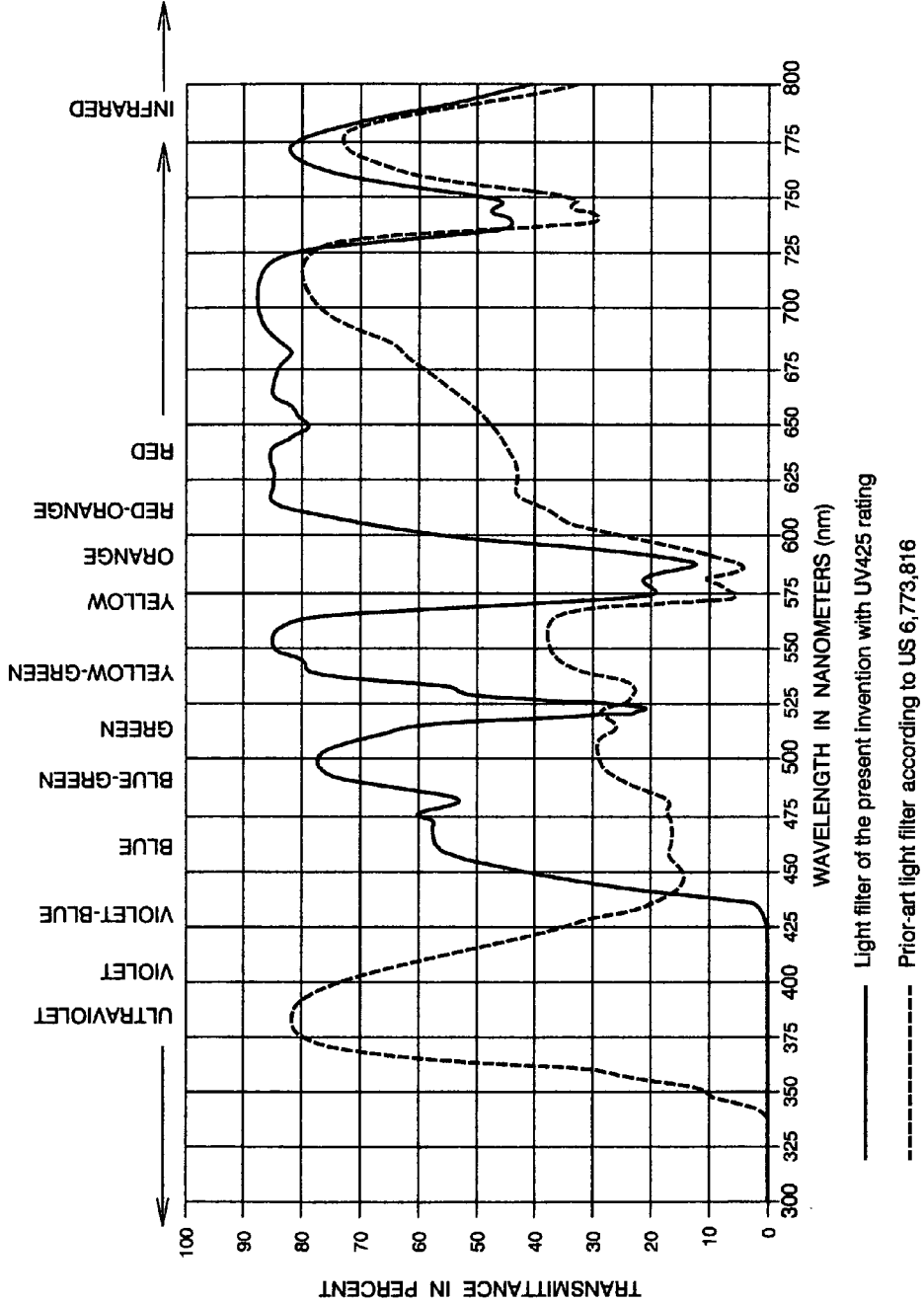
FIG. 6 is a graph comparing the light-transmittance properties of a multiband contrast enhancer of the present invention to the light-transmittance properties of a first light filter comprising neodymium oxide and praseodymium oxide as disclosed in U.S. Pat. No. 6,773,816.
Figure 7:
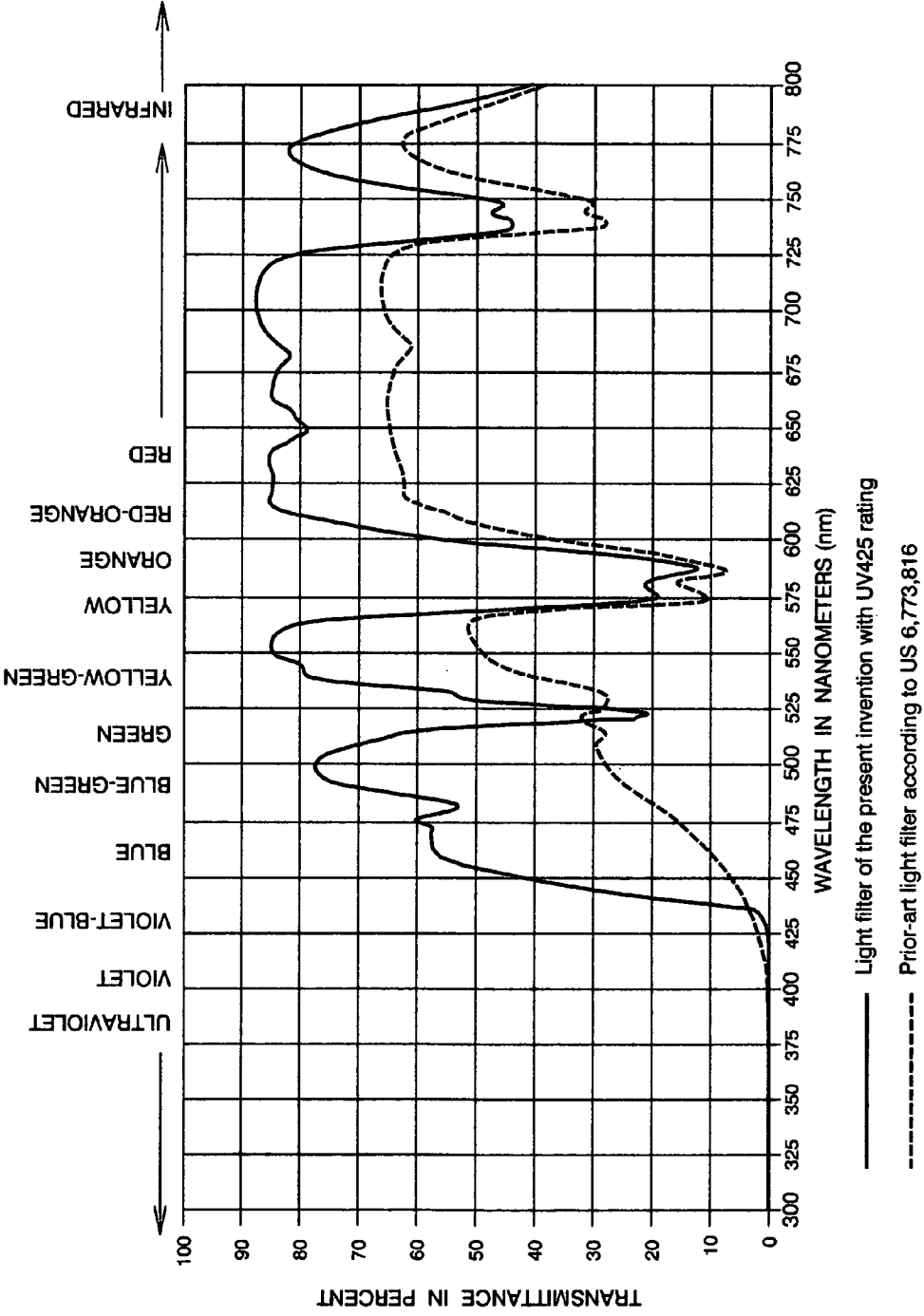
FIG. 7 is a graph comparing the light-transmittance properties of a multiband contrast enhancer of the present invention to the light-transmittance properties of a second light filter comprising neodymium oxide and praseodymium oxide as disclosed in U.S. Pat. No. 6,773,816.
Figure 8:
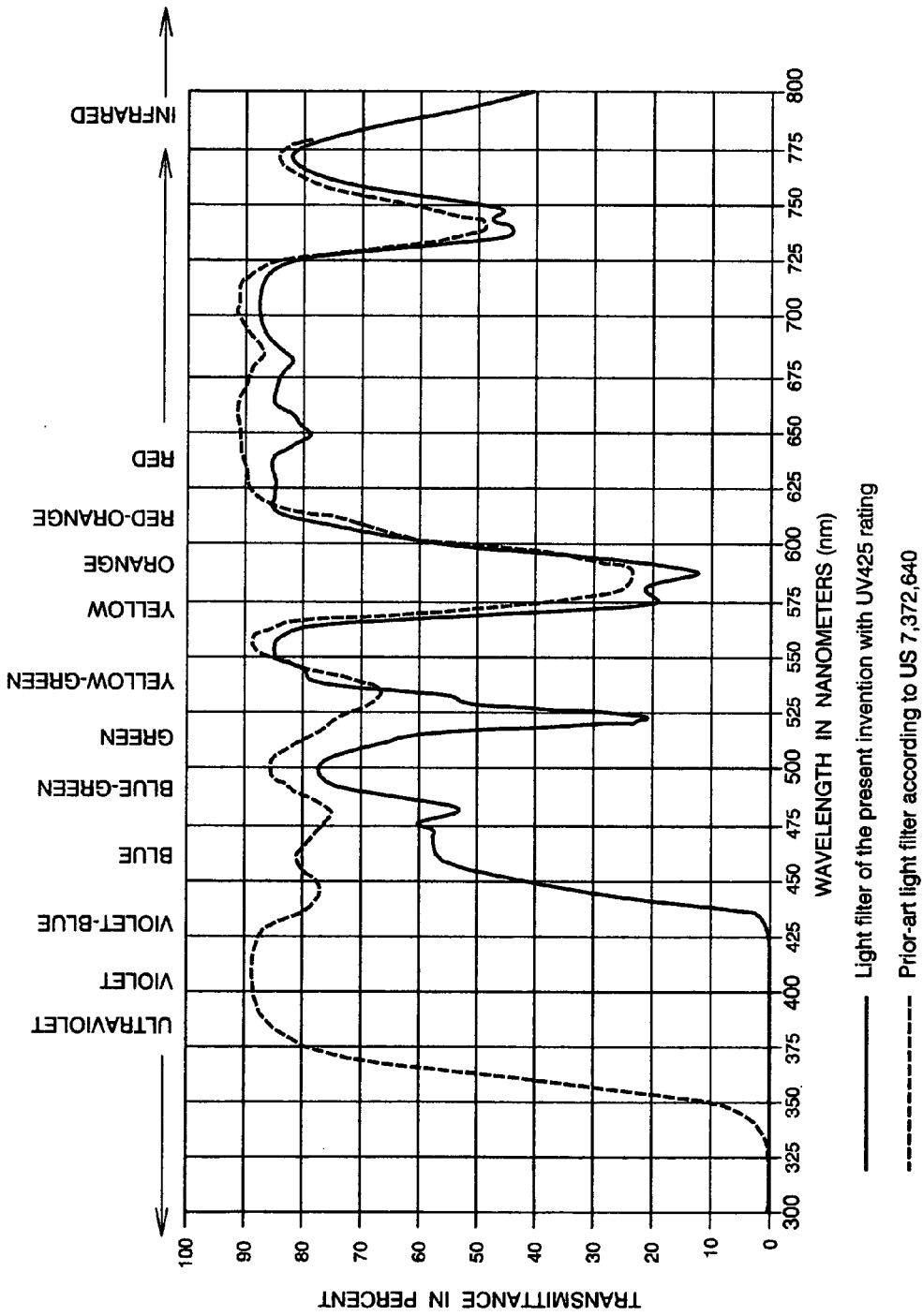
FIG. 8 is a graph comparing the light-transmittance properties of a multiband contrast enhancer of the present invention to the light-transmittance properties of a light filter comprising neodymium oxide and praseodymium oxide as disclosed in U.S. Pat. No. 7,372,640.

FIG. 1 is a section view of laminated lens assembly 10 of the preferred embodiment of the present invention, depicting polarizing film 15 disposed between front lens element 13 and rear lens element 17, with the lamination secured by adhesive layers 14 and 16. Laminated lens assembly 10 also has coatings 12 and 18 applied to the front and rear exterior exposed surfaces, respectively.

The phrase "luminous transmittance" as used herein refers to the mean light transmittance of an optical lens or filter over the range of visible wavelengths of light as measured and defined within American National Standards Institute (ANSI) specification Z80.3-2001. The phrase "light transmittance" as used herein refers to the actual measured value of the passage of light through an optical lens or filter expressed as a percentage of the total amount of light entering the optical lens or filter, and is measured using a specified wavelength of light. A series of individual light-transmittance measurements are made wavelength by wavelength (preferably in 1 nm increments) using an instrument known as a spectrophotometer in order to calculate the luminous transmittance of an optical lens or filter.

CIE illuminant D65 refers to a type of light source which is used in the optical industry to simulate the spectral power distribution of midday sun when making spectral transmittance measurements. CIE is the acronym for "Commission Internationale de l'Eclairage" (French for "International Commission on Illumination").

Abbe value is a figure of merit well-known in the optics industry that is a measure of the degree to which an optical medium (such as transparent glass or plastic) refracts (bends) light rays by different amounts depending on the wavelength of the light passing through the optical medium. If present in a sufficient amount, this wavelength-dependent variation in refraction causes a color-fringing effect along the edges of objects viewed through that optical medium, and hence, a loss of perceived sharpness (visual acuity) occurs. This type of distortion in optics is called chromatic aberration, and is inversely proportional to the Abbe value of the optical medium.

References are made herein to the "front" element and "rear" lens element of a fully-assembled polarized lens. In a fully-assembled polarized lens of the present invention the "front" lens element is that lens element which has an exposed convex surface, such as lens element 13 of FIG. 1, while the "rear" lens element is that lens element which has an exposed concave surface, such as lens element 17 of FIG. 1.

Specification ANSI Z80.3-2001 Sections 4.6.3.2 and 4.6.3.3 impose certain restrictions with regard to the light-transmittance properties of sunglass lenses intended for driving and road use. This includes requirements for traffic-signal recognition and uniformity of spectral transmittance. These requirements are met in lenses of the present invention by properly formulating the amounts of the rare-earth oxides and other colorants in order to yield the desired result.

Methods for making polarized sunglass lenses have been well-known for many years within the sunglass industry and will therefore only be summarized here. In simple terms, polarized glass lenses are produced by grinding and polishing two round, thin lens elements (typically about 1 mm thick) to a precisely-nesting curvature and forming a polarizer film to a matching curvature. The polarizer film is then laminated between the lens elements with a thin layer of epoxy resin between each lens element and the polarizer film. An appropriate amount of light-curing epoxy resin is applied between the polarizer film and the lens elements, then the entire lens assembly is squeezed together usually with an eccentric orbital scrubbing motion to force out the excess epoxy resin and eliminate trapped air bubbles. The lens assembly is finally subjected to a light source having an output spectrum and intensity suitable to initiate curing of the epoxy resin. Once the epoxy has cured, excess resin and film protruding around the edge of the laminated lens is trimmed. The lens is then ready to be ground to the required shape and finished around the edge (i.e., "edged") to fit the intended eyeglass frame.

All sunglass lenses of the present invention include a multiband contrast enhancer. A multiband contrast enhancer of the present invention is a light filter in the form of a lens element or layer comprising narrowband and sharp-cut light-filtering means, said light-filtering means providing the following light-transmittance properties:

a) a maximum light transmittance for at least one wavelength within each of three wavelength ranges, the first wavelength range being from 490 nm to 510 nm, the second wavelength range being from 540 nm to 560 nm, the third wavelength range being from 620 nm to 720 nm, wherein the wavelengths of maximum light transmittance in each of the three wavelength ranges have a transmittance value which is at least 120 percent of the value of luminous transmittance of the multiband contrast enhancer;

b) a minimum light transmittance for at least one wavelength within each of two wavelength ranges, the first wavelength range being from 515 nm to 530 nm, the second wavelength range being from 570 nm to 590 nm, wherein the wavelengths of minimum light transmittance in each of the wavelength ranges have a transmittance value less than 75 percent of the value of luminous transmittance of the multiband contrast enhancer;

c) a light transmittance so that the value of the light transmittance at 400 nm is less than 50 percent of the value of the luminous transmittance of the multiband contrast enhancer;

d) a light transmittance so that the value of the light transmittance at any wavelength from 200 nm up to a blocking wavelength is less than 1 percent, said blocking wavelength being between 380 nm and 460 nm; and e) wherein the light transmittance and luminous transmittance values of the multiband contrast enhancer are measured using CIE illuminant D65 in accordance with ANSI specification Z80.3-2001.

A particular type of base glass composition is preferred for glass lenses of the present invention. A base glass composition is a glass formulation to which various colorants or other dopants can be added in order to produce the desired light transmittance and other properties in the finished glass. For the multiband contrast enhancer of the present invention, the preferred base glass composition provides sharp-cut filtering of violet and UV wavelengths, utilizes copper halide or other cuprous compounds such as copper indium bisulfide or copper indium biselenide, and is usually subjected to an annealing process wherein the glass is reheated and held at a predetermined temperature for a predetermined time interval to produce the desired filter properties.

A principal advantage of certain types of sharp-cut UV-blocking glass is their very mild coloration, virtually unnoticeable in some formulations, which facilitates the task of achieving the desired tint and light transmittance by adding selected colorants to the glass during the manufacturing process. Examples of nearly-colorless ophthalmic glass for blocking UV and violet wavelengths have been publicly disclosed or patented and are available from Schott and Corning. Processes for manufacturing sharp-cut filter glass are the subject of various patents including U.S. Pat. No. 5,925,468 issued to Stewart; U.S. Pat. No. 6,420,290 B1 issued to Brocheton, et al; U.S. Pat. No. 6,667,259 issued to Clasen, et al; and U.S. Pat. No. 6,852,657 issued to Kolberg, et al.

One example of sharp-cut UV filter glass in a nearly-colorless formulation known as "UV420" is available from Schott AG of Mainz, Germany. This glass composition utilizes copper halide, is compatible with rare-earth oxides such as used in the present invention, and thus can be used as the base composition into which the selected rare-earth oxides are added to produce the multiband contrast enhancer of the present invention. Schott UV420 is useful for sharp-cut filtering up to about 420 nm in lens elements of 1 mm thickness. A similar glass composition is available from Corning SA of Avon Cedex, France.

Another sharp-cut filter-glass base composition which is similarly useful in lenses of the present invention is disclosed in the aforementioned U.S. Pat. No. 6,852,657 and allows for blocking wavelengths in the present invention to be as high as beyond 450 nm. This is a composition which utilizes copper indium compounds rather than copper halide.

In embodiments of the present invention which utilize glass lens elements, the multiband contrast enhancer is an ophthalmic glass lens element within a typical thickness range of approximately 0.8 to 1.0 mm with sharp-cut UV and violet light-filtering properties, containing oxides of neodymium and erbium, and in some embodiments, praseodymium. In addition to the aforementioned copper compounds and annealing process which are utilized to block UV and violet wavelengths, the multiband contrast enhancer of the preferred embodiment of the invention comprises neodymium oxide in the range of between 1.5 and 3.0 mole percent, erbium oxide in the range of between 0.5 and 2.0 mole percent, and optionally, praseodymium oxide in the range of between 0.25 and 1.75 mole percent. The amounts and ratios of these oxides are selected to produce a multiband contrast enhancer with the exact light transmittance properties desired within the scope of the present invention. Neodymium oxide is used to attenuate wavelengths centered near 585 nm. Erbium oxide is used to attenuate wavelengths centered near 520 nm. Praseodymium oxide, if present, is used to attenuate wavelengths in the range of 420 to 460 nm.

Plastic embodiments of the present invention can be implemented by using a plastic base composition which blocks UV and visible-violet light using sharp-cut light-filtering means such as disclosed in U.S. Pat. No. 6,770,692 issued to Kobayashi, et al. Alternatively, other sharp-cut UV-blocking and violet-blocking dyes known to the plastics industry can be used. Additional UV-blocking and violet-blocking means include surface stains and coatings.

Narrowband absorbing dyes can be added to plastic compositions to simulate in plastic lenses the light-transmittance properties provided by the the aforementioned rare-earth oxides in glass, according to methods and means such as disclosed in U.S. Pat. Nos. 6,650,473 and 6,807,006 issued to Nakagoshi. Additional narrowband absorbing means useful for plastic lenses include but are not limited to organic dyes as disclosed in U.S. Pat. No. 7,506,977 issued to Aiiso, and various narrowband non-fluorescing absorbing dyes for polycarbonate available from Exciton of Dayton, Ohio.

Several methods potentially useful for fabricating a plastic embodiment of the present invention are available. These include lamination methods similar to those used in the construction of laminated glass lenses, as well as several other methods of injection, casting, and forming well known to the industry and previously disclosed in numerous U.S. and foreign patents. One popular method of manufacturing a polarized plastic lens involves injection-molding the rear lens element in place with a previously-molded front lens element, the front lens element having a previously-attached polarizer film of a slightly smaller diameter than the front lens element. The polarizer is encapsulated fully as the two lens elements fuse together around the edge of the polarizer. In a preferred embodiment of a polarized plastic lens of the present invention, the front lens element is the multiband contrast enhancer.

Additional means for imparting narrowband or sharp-cut light-filtering properties to a lens element include reflection of selected portions of the visible spectrum by the application of multiple layers of optical interference coatings to the front surface of the lens element. This process produces absorption bands at the selected wavelengths and is offered by Omega Optical of Brattleboro, Vt.

Photochromic embodiments of the present invention can be constructed wherein the front lens element comprises an ophthalmic-grade photochromic composition and the rear lens element comprises the multiband contrast enhancer. However, to preserve the benefit of the present invention with regard to protecting internal polarizer dyes from UV-induced degradation, it is preferred to use a photochromic composition which blocks all UV light up to at least 380 nm when in the fully-darkened state. Many photochromic compositions do not effectively block UV wavelengths above approximately 360 nm when fully darkened as currently formulated and supplied; furthermore these compositions do require a sufficient amount of UV light penetrating the glass in order to cause the darkening to occur. However it is possible to reduce the UV and violet light transmittance of a photochromic lens element by applying a method disclosed in U.S. Pat. No. 5,694,240 issued to Sternbergh, which comprises a coating on the concave surface of the lens element. In a laminated construction such as a typical polarized lens this coating is fully encapsulated and therefore protected from damage. Because the coating is on the rear surface of the photochromic lens element, adequate amounts of UV light can still enter the photochromic lens element from the front in order to cause the desired darkening action when the lens is exposed to sunlight.

FIGS. 3, 4, 5, 6, 7, and 8 compare the transmittance of a typical light filter of the present invention with the transmittance of light filters of the prior art. The prior-art light filters in FIGS. 3, 4, 5, 6, and 8 all have relatively high transmittance of light at and near 400 nm. The prior-art light filter in FIG. 7 completely blocks wavelengths at 400 nm and below, but lacks sufficient transmittance in the blue spectrum (from around 450 nm to around 480 nm) to provide accurate and balanced color perception. A light filter of the present invention (referred to herein as a "multiband contrast enhancer") has adequate transmittance in the blue spectrum to promote accurate and balanced color perception, while at the same time blocking wavelengths at and below 400 nm which, if not blocked, could be harmful to the eyes of the wearer. In order to minimize chromatic aberration, a light filter of the present invention can be formulated to block visible-violet wavelengths up to 460 nm and may optionally include reduced transmittance of deep-red wavelengths beyond 700 nm.

Figure 9:
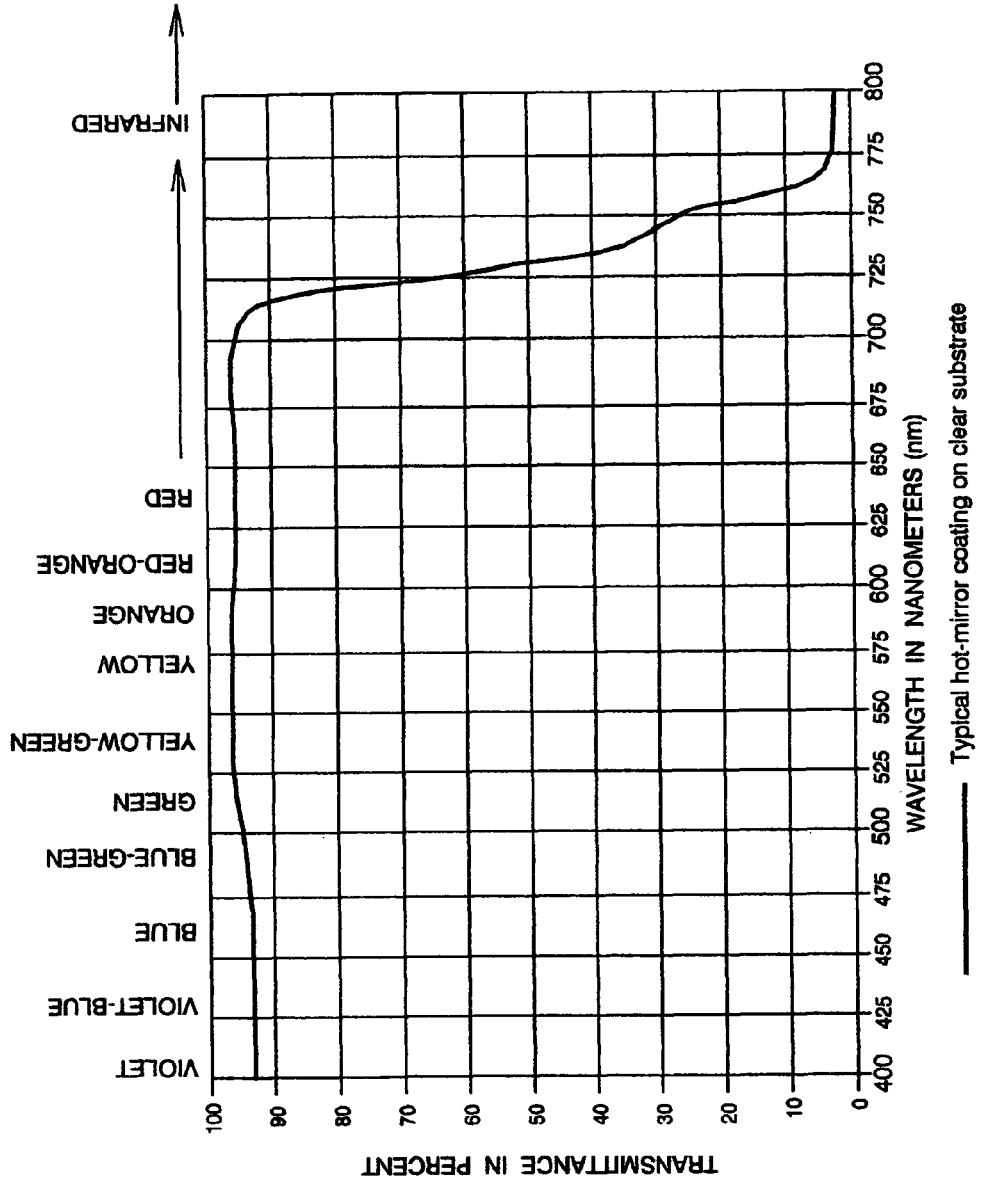
FIG. 9 is a graph of the light transmittance, over the visible range of wavelengths from 400 nm to 800 nm, of a typical hot-mirror coating of the prior art on a clear optical substrate.
Figure 10:
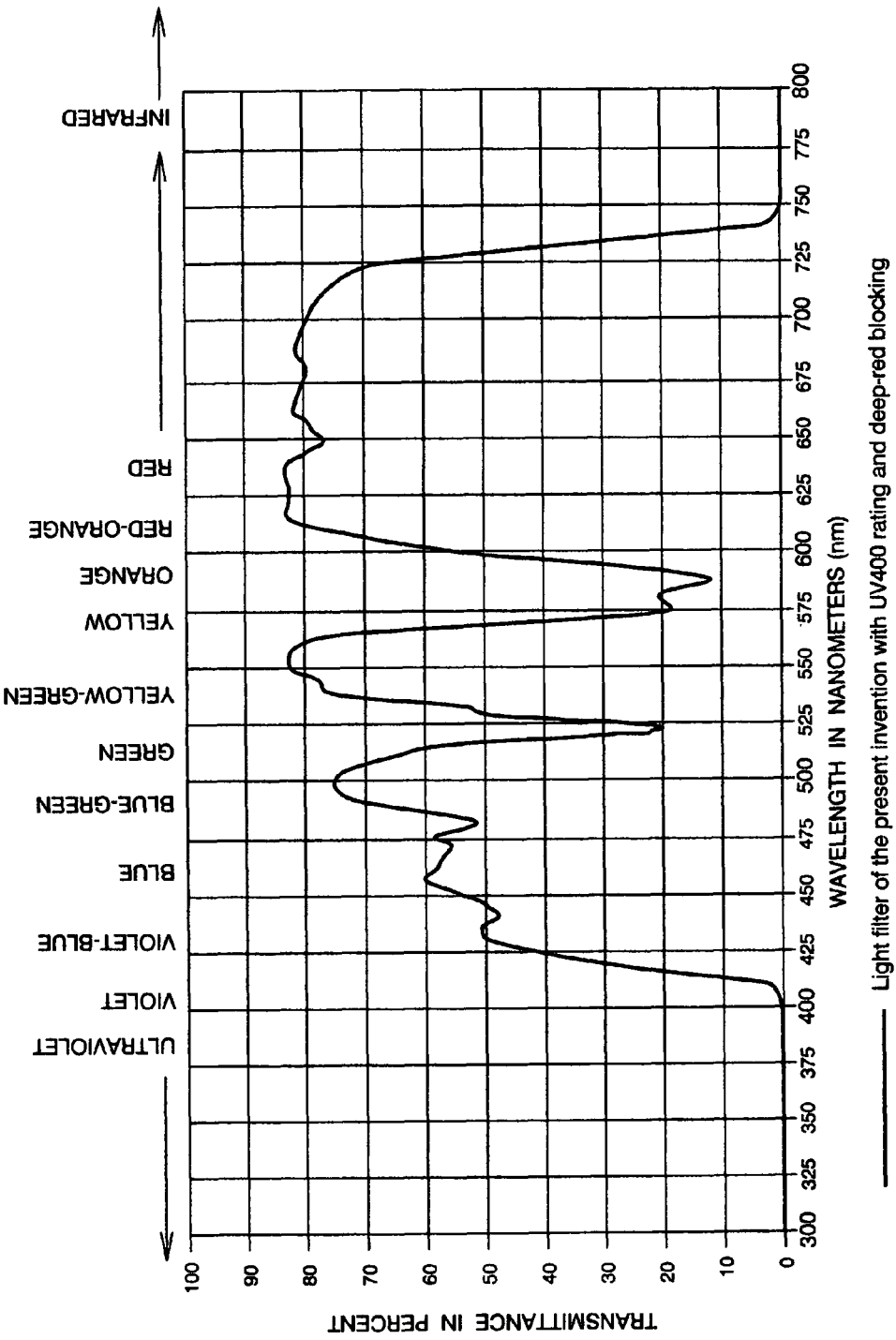
FIG. 10 is a graph of a multiband contrast enhancer of the present invention with UV400 rating and deep-red light filtering.
Figure 11:
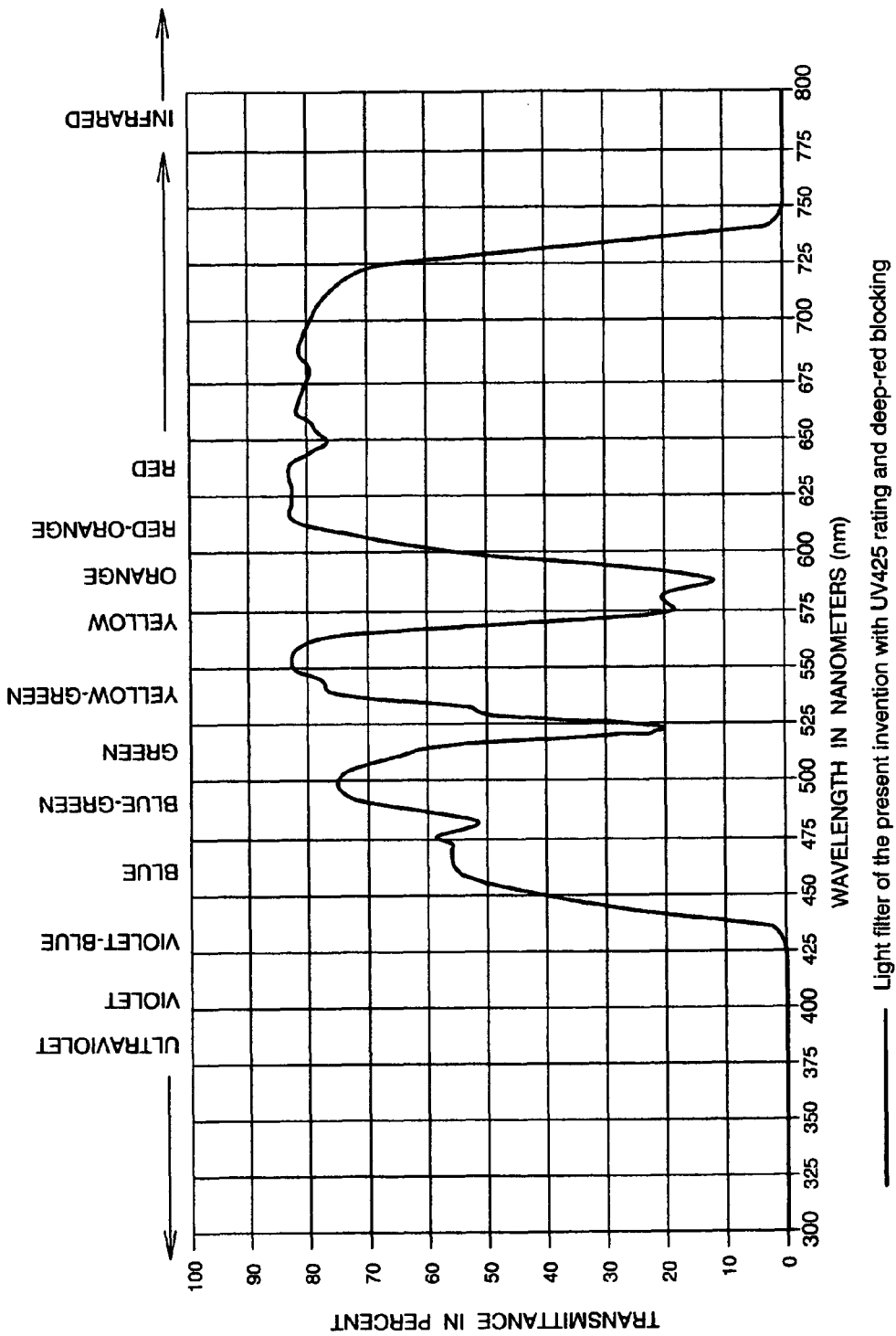
FIG. 11 is a graph of a multiband contrast enhancer of the present invention with UV425 rating and deep-red light filtering.
Figure 12:
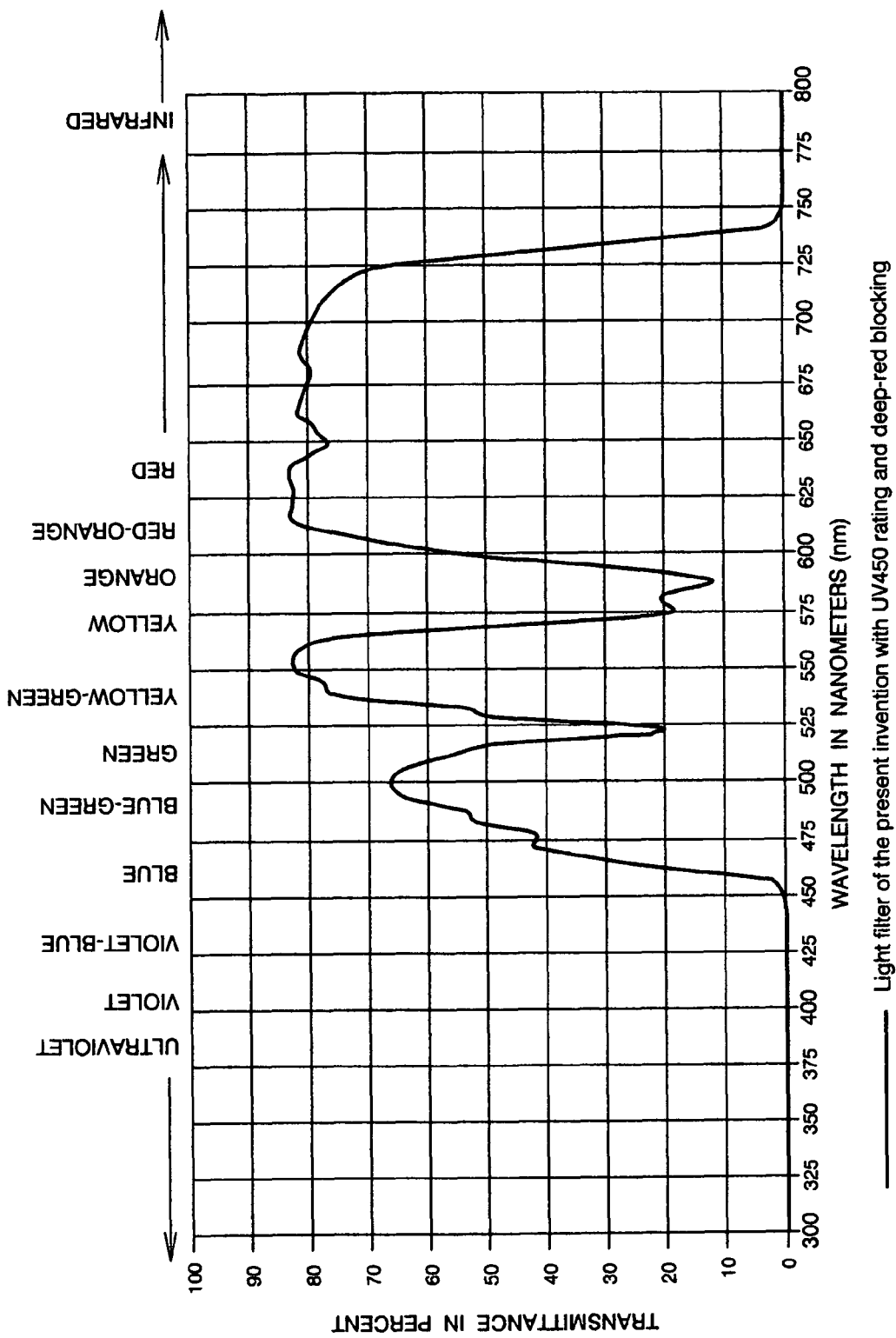
FIG. 12 is a graph of a multiband contrast enhancer of the present invention with UV450 rating and deep-red light filtering.

In all embodiments of the present invention, chromatic aberration of deep-red wavelengths, i.e., near-infrared, can be greatly reduced or eliminated by applying a coating well-known in the optical coating industry as a "hot mirror" to the front of the lens. This is a type of interference-layer mirror applied to the surface of a lens by evaporation process in a vacuum chamber and which selectively reflects a high percentage of light within the range of approximately 700-1000 nm, thus greatly reducing the transmittance of these wavelengths. FIG. 9 depicts the sharp-cut filtering of deep-red wavelengths provided by a hot-mirror coating available from Precision Glass and Optics of Santa Ana, Calif. Similar hot-mirror coatings are available from other optical coating vendors. FIGS. 10, 11, and 12 depict light filters of the present invention comprising a deep-red light-filtering means and three different degrees of filtering for UV and visible-violet wavelengths. None of the prior-art light filters shown in FIG. 3, 4, 5, 6, 7, or 8 provide filtering of deep-red wavelengths similar to the light filters of the present invention shown in FIGS. 10, 11, and 12. Those lenses of the present invention which comprise deep-red light-filtering means provide light transmittance of less than 30 percent at any wavelength between 750 nm and 800 nm; preferred embodiments of the present invention provide light transmittance of less than 10 percent at any wavelength between 750 nm and 800 nm.

Anti-reflective ("AR") coatings can be applied to lenses of the present invention in order to reduce unwanted surface reflections. The most common location for AR coatings on sunglass lenses is the rear (concave) surface. This prevents stray sunlight striking the rear surface of the lenses from reflecting back into the wearer's eyes. It also prevents the wearer from seeing a reflection of their eyes from the back of the lenses. A typical high-quality AR coating comprises several stacked layers of transparent material, usually a metallic fluoride (e.g. magnesium fluoride), deposited on the surface of a lens in a vacuum chamber. It is also common practice to apply a hydrophobic coating typically comprising silicon on top of the AR coating to facilitate cleaning and to prevent hard-water spots and other forms of staining.

Plastic prescription lenses with high values of optical correction often exhibit excess chromatic aberration. This is due to the plastic refracting (bending) light rays from different portions of the visible spectrum by different amounts, thus causing an edge-smearing effect often referred to as "fringing", resulting in a loss of visual acuity and possibly causing eyestrain. Chromatic aberration can be reduced by blocking those wavelengths most responsible for chromatic aberration, i.e., at the extreme ends of the visible spectrum. This is accomplished in lenses of the present invention by using a two-element structure for the lens, wherein the front lens element blocks pure violet wavelengths (and optionally deep-red wavelengths) before they can reach the rear lens element which comprises the prescription. Minimizing the transmittance of wavelengths that cause the most chromatic aberration is especially beneficial when the lens plastic has a low Abbe value and comprises a high value of prescriptive optical power (refraction), as chromatic aberration increases as optical power increases and Abbe value decreases.

It is to be understood that the forms of this invention as shown herein are merely preferred and alternate embodiments. Equivalent means may be substituted for those illustrated and described; without departing from the spirit and scope of the invention as defined in the following claims.

What is claimed is:

1. A multiband contrast enhancer comprising narrowband light-filtering means and sharp-cut light-filtering means, said multiband contrast enhancer providing:
   a) a maximum light transmittance for at least one wavelength within each of three wavelength ranges, the first wavelength range being from 490 nm to 510 nm, the second wavelength range being from 540 nm to 560 nm, the third wavelength range being from 620 nm to 720 nm, wherein the wavelengths of maximum light transmittance in each of the three wavelength ranges have a transmittance value which is at least 120 percent of the value of luminous transmittance of the multiband contrast enhancer;
   b) a minimum light transmittance for at least one wavelength within each of two wavelength ranges, the first wavelength range being from 515 nm to 530 nm, the second wavelength range being from 570 nm to 590 nm, wherein the wavelengths of minimum light transmittance in each of the wavelength ranges have a transmittance value less than 75 percent of the value of luminous transmittance of the multiband contrast enhancer;
   c) a light transmittance so that the value of the light transmittance at 400 nm is less than 50 percent of the value of the luminous transmittance of the multiband contrast enhancer;
   d) a light transmittance so that the value of the light transmittance at any wavelength from 200 nm up to a blocking wavelength is less than 1 percent, said blocking wavelength being between 380 nm and 460 nm; and
   e) wherein the light transmittance and luminous transmittance values of the multiband contrast enhancer are measured using CIE illuminant D65 in accordance with ANSI specification Z80.3-2001.

2. The multiband contrast enhancer of claim 1 comprising a glass lens element, said glass lens element comprising light-filtering means selected from a list including but not limited to neodymium oxide, praseodymium oxide, erbium oxide, copper halide, copper bromide, copper indium bisulfide, copper indium biselenide, and optical interference coatings.

3. A sunglass lens comprising the multiband contrast enhancer of claim 2 and a light polarizer, said sunglass lens meeting all applicable requirements of ANSI Z80.3-2001.

4. The sunglass lens of claim 3 wherein said sunglass lens comprises two lens elements adhered together with the light polarizer disposed between the two lens elements, and wherein the front lens element is the multiband contrast enhancer.

5. The sunglass lens of claim 4 wherein the rear lens element comprises a prescription lens.

6. The sunglass lens of claim 4 wherein said sunglass lens further comprises an anti-reflective coating applied to at least the rear surface of said sunglass lens.

7. The sunglass lens of claim 4 wherein said sunglass lens further comprises a semi-transparent mirror coating applied to the front surface of said sunglass lens.

8. The multiband contrast enhancer of claim 2 further comprising a deep-red light-filtering means, said deep-red light-filtering means providing a light transmittance so that the value of the light transmittance is less than 30 percent at any wavelength between 750 nm and 800 nm.

9. The multiband contrast enhancer of claim 1 comprising a plastic lens element, said plastic lens element comprising light-filtering means selected from a list including but not limited to narrowband absorbing dyes, sharp-cut absorbing dyes, and optical interference coatings.

10. A sunglass lens comprising the multiband contrast enhancer of claim 9 and a light polarizer, said sunglass lens meeting all applicable requirements of ANSI Z80.3-2001.

11. The sunglass lens of claim 10 wherein said sunglass lens comprises two lens elements adhered together with the light polarizer disposed between the two lens elements, and wherein the front lens element is the multiband contrast enhancer.

12. The sunglass lens of claim 11 wherein the rear lens element comprises a prescription lens.

13. The sunglass lens of claim 11 wherein said sunglass lens further comprises an anti-reflective coating applied to at least the rear surface of said sunglass lens.

14. The sunglass lens of claim 11 wherein said sunglass lens further comprises a semi-transparent mirror coating applied to the front surface of said sunglass lens.

15. The multiband contrast enhancer of claim 9 further comprising a deep-red light-filtering means, said deep-red light-filtering means providing a light transmittance so that the value of the light transmittance is less than 30 percent at any wavelength between 750 nm and 800 nm.

* * * * *